(12) United States Patent
Naito et al.

(10) Patent No.: US 7,166,348 B2
(45) Date of Patent: Jan. 23, 2007

(54) CORE MATERIAL FOR VACUUM HEAT INSULATION MATERIAL, AND VACUUM HEAT INSULATION MATERIAL

(75) Inventors: Masato Naito, Kanuma (JP); Hiroyuki Gokuraku, Imaichi (JP); Daisuke Imanari, Tochigi-ken (JP); Noritoshi Nishiyama, Utsunomiya (JP)

(73) Assignee: JSP Corporation, Tokyo (JP)

( * ) Notice: Subject to any disclaimer, the term of this patent is extended or adjusted under 35 U.S.C. 154(b) by 469 days.

(21) Appl. No.: 10/380,280

(22) PCT Filed: Sep. 14, 2001

(86) PCT No.: PCT/JP01/08007

§ 371 (c)(1),
(2), (4) Date: Mar. 12, 2003

(87) PCT Pub. No.: WO02/22723

PCT Pub. Date: Mar. 21, 2002

(65) Prior Publication Data

US 2003/0175493 A1  Sep. 18, 2003

(30) Foreign Application Priority Data

Sep. 14, 2000  (JP) .............................. 2000-280584

(51) Int. Cl.
  B32B 4/18 (2006.01)
  B29C 44/42 (2006.01)
(52) U.S. Cl. ...................... 428/71; 428/76; 428/315.5; 428/315.7; 428/319.3; 428/319.7; 264/53; 264/102
(58) Field of Classification Search .............. 428/315.5, 428/315.7, 71, 76, 319.3, 319.7; 264/53, 264/102
See application file for complete search history.

(56) References Cited

U.S. PATENT DOCUMENTS 3,536,787 A    10/1970  Street ......................... 260/880
5,411,687 A    5/1995  Imeokparia et al. .......... 264/50
5,674,916 A *  10/1997  Shmidt et al. ................ 521/79
5,679,718 A    10/1997  Suh et al. ..................... 521/53
5,780,521 A    7/1998  Shmidt et al. ................ 521/79
5,824,710 A    10/1998  Imeokparia et al. .......... 521/79
5,854,295 A    12/1998  Suh et al. ..................... 521/82
5,863,960 A    1/1999  Shmidt et al. ............. 521/146
5,977,197 A    11/1999  Malone ..................... 521/146
6,071,580 A    6/2000  Bland et al. ............... 428/36.5

FOREIGN PATENT DOCUMENTS

| | | |
|---|---|---|
| DE | 100 05 873 A1 | 9/2000 |
| EP | 376064 | 7/1990 |
| JP | 52-107087 | 9/1977 |
| JP | 62-280205 | 12/1987 |
| JP | 3-237139 | 10/1991 |
| JP | 4-71603 | 3/1992 |
| JP | 8-231634 | 9/1996 |
| WO | 96/34038 | 10/1996 |
| WO | 98/59194 | 12/1998 |

* cited by examiner

Primary Examiner—Hai Vo
(74) Attorney, Agent, or Firm—Bacon & Thomas, PLLC

(57) ABSTRACT

Description is made of an open cell polystyrene resin foam having a content of organic volatile matters of less than 100 ppm. The open cell foam is suitable as a core material for a sound insulating material or a vacuum heat insulating material.

The open cell foam can be produced by melt-kneading a polystyrene resin having a content of organic volatile matters of 100 ppm or higher together with water in an extruder, sucking out the organic volatile matters as an azeotrope with water through a vent, injecting a blowing agent and kneading the injected mixture, and extruding the mixture into a lower pressure area to cause the resin to foam.

9 Claims, 1 Drawing Sheet

CORE MATERIAL FOR VACUUM HEAT INSULATION MATERIAL, AND VACUUM HEAT INSULATION MATERIAL

TECHNICAL FIELD

The present invention relates to a foam having an open cell structure (open cell foam) comprising a polystyrene resin and a method for producing the foam. The present invention also relates to a core material for a vacuum heat insulating material and to a vacuum heat insulating material.

BACKGROUND ARTS

A vacuum heat insulating material produced by packing a core material having shape retention properties with a gas barrier film and evacuating the inside of the film exhibits good heat insulating properties by evacuating gas remaining in the core material. Thus, a material having compressive strength to withstand the evacuation and being capable of forming a vacuum insulation space is used for the core material.

Conventionally known examples of the core material for a vacuum heat insulating material include (1) a material obtained by solidifying inorganic fine particles such as silica powder or perlite powder; (2) open cell polyurethane foam; and (3) a material obtained by solidifying glass fibers. The material (1) is made of super fine particles and thus causes a problem of dust particles in the production and disposal processes. The material (2) is easy to handle but difficult to recycle. Also, the material (2) needs two to three hours' predrying at 120° C. as a pretreatment prior to vacuum packing because the resin contains a minor amount of volatile matters such as water and carbon dioxide gas. The material (3) has a problem in handling caused by scattering of glass fibers as in the case with inorganic powders.

Recently, a polystyrene open cell foam for a vacuum heat insulating material has been disclosed in PC(WO)H11-504362. Such a polystyrene resin foam, which is light in weight and easy to handle, is excellent as a core material for a vacuum heat insulating material. However, a vacuum heat insulating material obtained using the foam for a core has a great change in its heat insulating properties with time and does not have satisfactory quality.

An object of the present invention is to provide an open cell polystyrene resin foam suitable as a core material for a vacuum heat insulating material and a method for producing the foam. Another object of the present invention is to provide a core material for a vacuum heat insulating material comprising the foam and a vacuum heat insulating material produced using the core material.

DISCLOSURE OF INVENTION

As a zealous studies to accomplish the above objects, the present inventors found that the reason why a vacuum heat insulating material produced by packing an open cell foam of a polystyrene resin with a gas barrier film and evacuating the inside of the film has a great change in its heat insulating properties with time is that the foam contains organic volatile matters including styrene derivatives in addition to remaining blowing agent and this causes a great change in the degree of vacuum in the vacuum package with time, and has accomplished the present invention.

According to the present invention, there are provided an open cell foam, a method for producing the open cell foam, a core material for a vacuum heat insulating material comprising the foam, and a vacuum heat insulating material produced using the core material as follows:

(1) An open cell foam characterized in that said open cell foam comprises a polystyrene resin foam having an open cell content of at least 90%, a density of 0.03–0.4 g/cm$^3$ and a cell diameter in the direction of the thickness of said foam of less than 400 µm, and in that said polystyrene resin foam has a content of organic volatile matters (organic matters having a boiling point of not higher than 160° C. under ambient pressure) of less than 100 ppm.

(2) An open cell foam as recited in (1), characterized in that said polystyrene resin foam has a content of organic volatile matters of 50 ppm or less.

(3) An open cell foam as recited in (1), characterized in that said polystyrene resin foam has a content of organic volatile matters of less than 20 ppm.

(4) An open cell foam as recited in any one of (1) to (3), characterized in that said polystyrene resin foam has a cell diameter in the direction of the thickness of said foam of 80 to 200 µm.

(5) An open cell foam as recited in any one of (1) to (4), characterized in that said polystyrene resin foam has a thickness of 5.0 to 50.0 mm.

(6) A method for producing an open cell foam according to (1) having a content of organic volatile matters of less than 100 ppm, characterized in that said method comprises melt-kneading a polystyrene resin having a content of organic volatile matters of less than 100 ppm together with a blowing agent in an extruder, and then extruding the kneaded mixture into a lower pressure area to cause said polystyrene resin to foam.

(7) A method for producing an open cell foam according to (1), characterized by comprising melt-kneading a polystyrene resin together with water in an extruder, sucking out volatile matters through a vent as an azeotrope with water, injecting a blowing agent and kneading said polystyrene resin therewith, and extruding the kneaded mixture into a lower pressure area to cause said polystyrene resin to foam.

(8) A core material for a heat insulating material comprising an open cell foam according to any one of (1) to (5) and having a density of 0.03 to 0.2 g/cm$^3$ and a 5% compression strength at 23° C. of at least 0.05 MPa.

(9) A method for producing an open cell foam according to claim 6 or 7, characterized in that said blowing agent comprises, as a main component, at least one blowing agent selected from propane, methyl chloride, dimethyl ether, methyl ethyl ether and diethyl ether.

(10) A vacuum heat insulating material produced by covering a core material according to (8) with a gas barrier film, and evacuating the inside of said film.

BEST MODE FOR CARRYING OUT THE INVENTION

Examples of polystyrene resins for use in the present invention include polystyrene resins and polystyrene resin compositions having a styrene component content of at least 50% by weight (preferably at least 60% by weight, more preferably at least 80% by weight) such as styrene homopolymer resins, styrene copolymer resins produced from styrene and another monomer, mixtures of a styrene homopolymer resin and/or a styrene copolymer resin with a styrene-conjugated diene block copolymer or its hydrogenation product, rubber-modified styrene resins (impact resistant polystyrene) obtained by polymerization of a styrene monomer in the presence of a rubber-like polymer, and mixtures of the above styrene resins with another resin and/or another rubber like (co)polymer.

Specific examples of the styrene copolymer resins include styrene-acrylonitrile copolymer, styrene-butadiene-acrylonitrile terpolymer, styrene-acrylic acid copolymer, styrene-methacrylic acid copolymer, styrene-methyl methacrylate copolymer, styrene-ethyl methacrylate copolymer, styrene-methyl acrylate copolymer, styrene-ethyl acrylate copolymer, styrene-maleic anhydride copolymer, and polystyrene-polyphenylene ether copolymer.

Above all, the base resin for the open cell foam is preferably a polystyrene resin having a Vicat softening point of 110° C. or higher so that the core material of the vacuum heat insulating material can have sufficient heat resistance not to be deformed by heat. The upper limit of the Vicat softening point is about 140° C. for reasons of preventing the extrusion foaming temperature of the resin for obtaining an open cell foam from rising to such an extent that the decomposition reaction of the styrene component occurs. Especially preferred is the use of styrene-acrylic acid copolymer, styrene-methacrylic acid copolymer, styrene-methyl methacrylate copolymer, styrene-ethyl methacrylate copolymer, styrene-methyl acrylate copolymer, styrene-ethyl acrylate copolymer, or styrene-maleic anhydride copolymer because of their high heat resistance. A vacuum heat insulating material having a core of an open cell foam comprising the above resin exhibits an especially low thermal conductivity. The reason for that has not understood yet, but it is considered to be derived from the thermal conductivity of the resins.

The Vicat softening point is a value obtained according to JIS K7206 (1999, test load: Method B, by a fluid heating method under a heating rate of 50° C./hr). The samples are not subjected to annealing.

Examples of the above-described "another resin" include polyethylene resins such as low-density polyethylene, high-density polyethylene, and straight chain low-density polyethylene; polypropylene resins such as polypropylene, propylene-ethylene copolymer, and propylene-1 butane copolymer; polyolefin resins such as cyclic polyolefin; polycarbonate resins; polyester resins such as polyester of polyethylene terephthalate, polybutylene terephthalate, or polyethylene naphthalate; and polyphenylene ether resins. Examples of the above-described "another rubber like (co) polymer" include polyolefin thermoplastic elastomer, and polyester thermoplastic elastomer.

Various additives, such as cell regulating agent (nucleating agent), antioxidant, thermal stabilizer, antistatic agent, conductivity imparting agent, weathering agent, ultraviolet absorber, colorant, flame retardant, and inorganic filler, may added to the polystyrene resin to such an extent that they do not interfere with the objects of the present invention.

Illustrative of blowing agents suitable to obtain a foam with a high open cell content of the present invention are chlorinated hydrocarbons such as methyl chloride, methylene chloride, and ethyl chloride; chlorofluorocarbons such as 1,1,1-trichloroethane, 1,1-dichloro-1-fluoroethane (HCFC-141b), 1,1-dichloro-2,2,2,-trifluoroethane (HCFC-123), chlorodifluoromethane (HCFC-22), and 1-chloro-1,2,2,2-tetrafluoroethane (HCFC-124); aliphatic hydrocarbons such as methane, ethane, propane, n-butane, isobutane, n-pentane, isopentane, and neopentane; fluorocarbons such as 1,1-difluoroethane (HFC-152a), 1,1,1-trifluoroethane (HFC-143a), 1,1,1,2-tetrafluoroethane (HFC-134a), and difluoromethane (HFC-32); alcohols, carbon dioxide ($CO_2$), water, and nitrogen. The blowing agents may be used alone or in combination. As a blowing agent to obtain a core material for a vacuum heat insulating material, one which quickly diffuses into the air from the inside of the foam is preferred. Illustrative of such blowing agents are chlorinated hydrocarbons such as methyl chloride, ethyl chloride, and ethylene chloride; alcohols, propane, dimethyl ether, methyl ethyl ether, diethyl ether, water, nitrogen, and carbon dioxide. The blowing agents may be used alone or in combination.

Above all, the blowing agent is preferably composed mainly of at least one blowing agent selected from propane, methyl chloride, ethyl chloride dimethyl ether, methyl ethyl ether and diethyl ether because an open cell foam having an high open cell content can be easily obtained with a high productive efficiency. Especially preferred is the use of a blowing agent mainly composed of at least one blowing agent selected from methyl chloride, propane, and dimethyl ether because the foaming temperature range of these blowing agents is so wide that an open cell foam can be easily obtained. The blowing agent may contain 5–50 mol % of water, nitrogen or carbon dioxide to ensure safety against ignition and safety of humans and to obtain open cells more easily. To "be composed of at least one blowing agent" herein means to contain the blowing agent(s) at least 50 mol % when the total amount of the blowing agent is taken as 100 mol %.

In the present invention, the amount of the blowing agent, which is determined on the density of the intended foam, is generally 0.05–2.5 mol per 1 kg of the material resin to obtain a foam with a density of 0.03–0.4 $g/cm^3$.

The open cell foam of the present invention obtained using a polystyrene resin has a density of 0.03–0.4 $g/cm^3$ An open cell foam having a density of over 0.4 $g/cm^3$ exhibits so poor heat insulating properties that a high-performance heat insulating material cannot be obtained. An open cell foam having a density of lower than 0.03 $g/cm^3$ tends to have insufficient compressive strength. For example, when such an open cell foam is vacuum packed, the cells cannot withstand the difference between the vacuum pressure in the wrapping material and the ambient pressure and are deformed. Thus, it is difficult to obtain a good vacuum heat insulating material.

The open cell foam of the present invention obtained using a polystyrene resin has a cell diameter T in the direction of the thickness of the foam of less than 400 μm, preferably not greater than 300 μm. A polystyrene resin open cell foam having a cell diameter T in the direction of the thickness of the foam of not smaller than 400 μm exhibits poor heat insulating properties. The lower limit of the cell diameter T is preferably about 50 μm.

The control of the cell diameter of the open cell foam of the present invention, the method for which is dependent on the physical properties of the polystyrene resin and the density of the foam, is made by changing the content of carbon dioxide or nitrogen in an organic blowing agent such as a chlorofluorocarbon, aliphatic hydrocarbon or fluorocarbon or adding a cell regulating agent, such as talc, in an amount of 1–30 parts by weight per 100 parts of the polystyrene resin.

The cell diameter herein is an average cell diameter obtained by the following method. Using a microscope or the like, an enlarged image of a cross-section of the foam in the extrusion direction or the width direction is projected on a screen or monitor. On the projected image, a straight line is drawn in the measuring direction (in the thickness direction when the cell diameter in the thickness direction is measured) and the number of cells through which the line passes is counted. Then, the average cell diameter is obtained by dividing the length of the line (which is not the length on the enlarged projected image but the real length calculated taking the magnification into account) by the number of the counted cells.

The polystyrene resin open cell foam of the present invention has an open cell content of at least 90%, preferably at least 95%. The upper limit of the open cell content is 100%. An open cell foam having an open cell content of 90% or higher exhibits excellent sound insulating properties and vacuum heat resistance properties. An open cell foam having an open cell content of lower than 90% cannot have a good heat insulating effect since the closed cell in the foam cannot suck remaining foaming gas when the foam is vacuum packed to obtain a vacuum heat insulating material.

The open cell content of the polystyrene foam is obtained according to ASTM D-2856-70 (Procedure C) as follows. The true volume $Vx$ ($cm^3$) of a sample of the foam is measured with an air comparison pycnometer, and the closed cell content is calculated by the formula (1). The apparent volume $Va$ ($cm^3$) of the sample is the volume calculated from the outer dimension thereof. The true volume $Vx$ ($cm^3$) of the sample is the sum of a volume of the resin constituting the foam and the total volume of all the closed cells in the sample. Thus, the open cell content is obtained by the following formula (1).

$$\text{Open cell content (\%)} = (Va - Vx) \times 100 / (Va - W/\rho) \quad (1)$$

wherein W represents the weight (g) of the sample, and $\rho$ represents the density ($g/cm^3$) of the base resin of the foam.

In the measurement of open cell content, a rectangular solid piece with a size of 25 mm long×25 mm wide×40 mm thick cut off from the foam is used as a sample. When a sample having a thickness of 40 mm cannot be cut off from a foam, two or more samples may be used together. In this case, the samples are as close to the same size as possible, and the smaller the number of the samples is, the better. Also, the total volume of the samples calculated from the outer dimensions thereof should be 25 $cm^3$. The open cell content of the present invention is an arithmetic average of measurements of ten different samples randomly selected.

When the open cell foam of the present invention is used as a core material for a heat insulating material, it preferably has a density of 0.03–0.2 $g/cm^3$, more preferably 0.03–0.1 $g/cm^3$ for reasons of prevention of deformation of the cells in vacuum packing and good thermal conductivity. The open cell foam of the present invention preferably has a cell diameter T in the direction of the thickness of the foam of 80–300 μm, more preferably 80–200 μm, most preferably 100–200 μm. Such an open cell foam is suitable as a core material for a vacuum heat insulating material.

The foam of the present invention has a content of organic volatile matters of less than 100 ppm (by weight), preferably 50 ppm or less, more preferably less than 20 ppm. Thus, the foam of the present invention is excellent in vacuum retention properties after vacuum packing. The pressure within the package of a vacuum heat insulating material must be kept at 1–250 Pa in absolute pressure to maintain the thermal conductivity thereof. A polystyrene resin foam is thought to contain organic volatile matters derived from styrene including styrene derivatives in addition to remaining blowing agent. Assuming that 150 ppm of organic volatile matters come off from the foam, the vacuum degree is reduced (the pressure in the package is increased) by 240 Pa in terms of styrene monomers in theory. Namely, an open cell foam obtained using a polystyrene resin and having an organic volatile matters content of greater than 100 ppm is not suitable as a core material for a vacuum heat insulating material since the organic volatile matters lower the vacuum degree after vacuum packing. The lower limit of the content of organic volatile matters in the foam is 0 ppm.

The organic volatile matters are organic matters having a boiling point of not higher than 160° C. under ambient pressure. Illustrative of such organic matters are chlorinated hydrocarbons such as methyl chloride and ethyl chloride; chlorofluorocarbons; fluorocarbons; aliphatic hydrocarbons such as methane, butane, and propane; alcohols; ethers such as dimethyl ether, methyl ethyl ether, and diethyl ether, which are included in the blowing agents; aromatic hydrocarbons such as xylene; and aromatic hydrocarbons derived from polystyrene such as toluene, ethyl benzene, propylbenzene, and styrene monomers.

The determinate quantity of the organic volatile matters is measured by gas chromatography as follows. 1 Gram of a sample cut off from a foam is put in a sample bottle containing a solvent such as dimethylformamide and an internal standard substance such as cyclopentanol to dissolve the sample in the solvent. The solution in the sample bottle is injected into a chromatograph to obtain a chromatogram.

More specifically, the determinate quantity of organic volatile matters derived from polystyrene such as toluene, ethyl benzene, propylbenzene, and styrene monomers is measured by the following method. 1 Gram (which corresponds to Ws in the formula (2)) of a sample is cut off from a polystyrene resin or a foam and dissolved in 20 ml of dimethylformamide containing 0.001 g of cyclopentanol (5 g (which corresponds to Wi in the formula (2)) of cyclopentanol is dissolved in 10000 mL of dimethylformamide to obtain an internal standard substance having a cyclopentanol concentration of 5 g/10000 mL). With a microsyringe, 1 μL of the solution is injected into a gas chromatograph to obtain a chromatogram. The conditions of gas chromatography are as follows.

The peak areas of each of the organic volatile matters and the internal standard are obtained from the thus obtained gas chromatogram, and the concentration of the organic volatile matter is obtained by the formula (2).

$$\text{Organic volatile matter concentration (ppm)} = [(Wi/10000) \times 2] \times [An/Ai] \times Fn \div Ws \times 1000000 \quad (2)$$

wherein

Wi: weight (g) of cyclopentanol at the time when the internal standard solution was prepared.

Ws: weight (g) of the sample dissolved in DMF (dimethylformamide).

An: peak area of each of the organic volatile matters at the time when the gas chromatography was performed.

Ai: peak area of the internal standard obtained at the time when the gas chromatography was performed.

Fn: correction coefficient for each of the organic volatile matters.

The correction coefficient for each organic volatile matter is obtained as follows. Six working solutions containing an organic volatile matter and an internal standard (cyclopentanol) at different mixing ratios are prepared and injected into a gas chromatograph to obtain gas chromatograms to obtain a working curve for use in gas chromatography. The measurements of the organic volatile matter based on the gas chromatograms are plotted on a graph where the horizontal axis represents the weight ratio of the volatile matter content to the internal standard in the working solutions [weight of volatile matter/weight of internal standard] and the vertical axis represents the peak area ratio of the volatile matter to the internal standard [peak area of volatile matter/peak area of internal standard] obtained by the gas chromatography. An example of the graph is shown in FIG. 1. The graph is approximated to a linear function by the least squares method and the gradient of the graph is obtained. The gradient is used as the correction coefficient Fn for the volatile matter.

In the above formula, (Wi/10000) (g/mL) in [(Wi/10000)×2] represents the concentration of the internal standard solution and 2 in [(Wi/10000)×2] means that 2 mL of the internal standard solution having the concentration is used.

In the case of volatile matters which do not dissolve in a solvent such as dimethylformamide, gas in the gas phase in the sample bottle can be used as the sample to be injected into the gas chromatograph.

The conditions of gas chromatography are as follows.
Device: Gas Chromatograph GC-6AM, manufactured by Shimadzu Corporation.
Column: glass column 3 mm in inside diameter and 5000 mm in length.
Column filler: [liquid phase] FFAP (free fatty acid), [liquid phase impregnation rate] 10% by weight, [support] diatomaceous earth for gas chromatography, Chromosorb W, [support particle size] 60/80 mesh, [support treatment method] AW-DMCS (washing with water, sintering, acid treatment and silane treatment), [amount] 90 mL.
Inlet temperature: 250° C.
Column temperature: 120° C.
Detector temperature: 250° C.
Carrier gas: $N_2$, flow rate 40 mL/min.
Detector: FID (flame ionization detector).
Determination: internal standard method.
Detection limit: 20 ppm.

In the chromatogram obtained in the measurement of the amount of the organic volatile matter, cyclopentanol as the internal standard substance and dimethylformamide as a solvent are also included. In the present invention, however, the contents of the internal standard substance and the solvent should be considered as 0 ppm.

Although description has been made of a specific organic volatile matter, other organic volatile mattes can be detected by changing conditions such an solvent, internal standard, inlet temperature, column temperature, detector temperature, and column depending upon the organic volatile mattes.

BRIEF DESCRIPTION OF DRAWINGS

The drawing is one example of a working curve used in measurement the amount of an organic volatile matter contained in a foam, wherein
A: weight ratio of an organic volatile matter (toluene) to internal standard (cyclopentanol).
B: peak area ratio of the organic volatile matter (toluene) to the internal standard (cyclopentanol) in a gas chromatogram.

As described before, the foam of the present invention must have a content of organic volatile matters of less than 100 ppm, preferably 50 ppm or lower, more preferably less than 20 ppm, which cannot be detected at a detection limit of 20 ppm (as mentioned before, the internal standard substance and the solvent used in the measurement, which are detected, are excluded). Most preferably, the foam has a content of organic volatile matters of 0.

Figure 1:
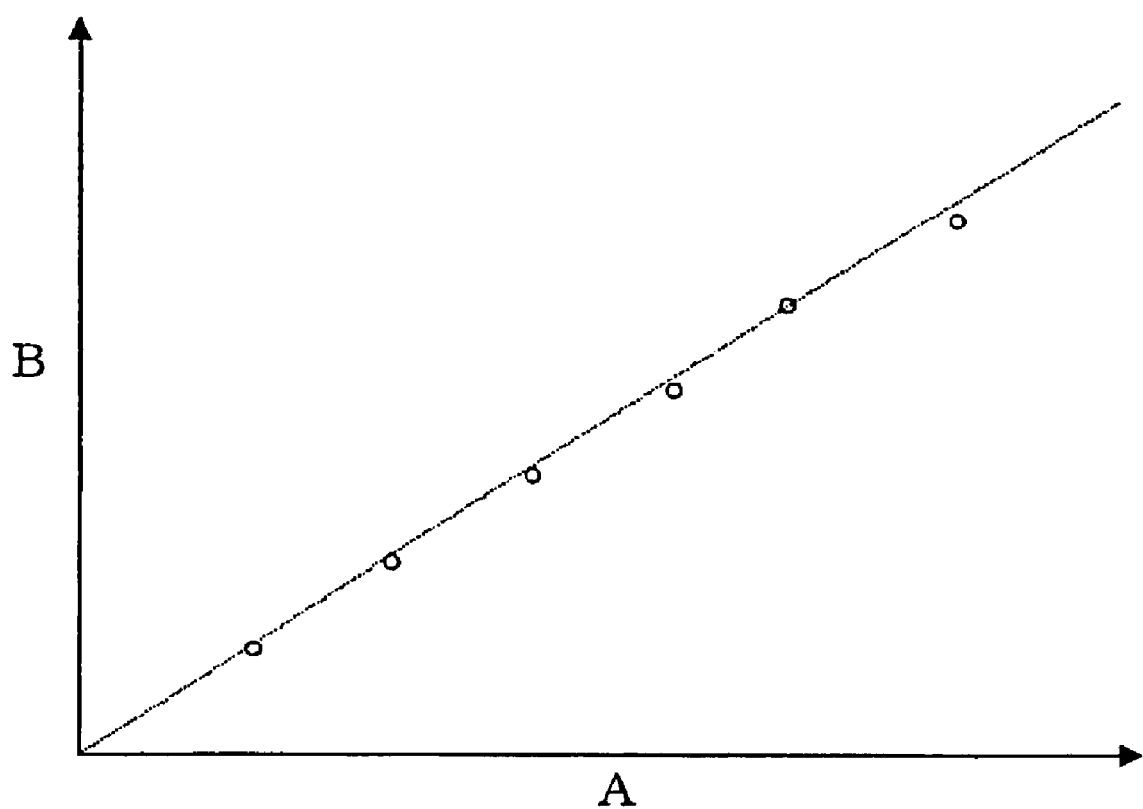

The styrene resin open cell foam of the present invention can be produced by a conventional device without any modification. Roughly divided, there are two production methods: method (a) comprising the steps of melt-kneading a polystyrene resin having a content of organic volatile matters of less than 100 ppm with or without a cell regulating agent, injecting a volatile blowing agent into the kneaded mixture under a high pressure to obtain a fluid gel, cooling the fluid gel to a temperature suitable to produce the foam, and extruding the fluid gel into a low-pressure area to evaporate the volatile blowing agent; and method (b) comprising the steps of kneading a polystyrene resin together with water in an extruder, sucking out organic volatile matters through a vent as an azeotrope with water, melt-kneading the kneaded mixture with or without a cell regulating agent, injecting a volatile blowing agent under a high pressure to obtain a fluid gel, cooling the fluid gel to a temperature suitable to produce the foam, and extruding the fluid gel into a low-pressure area to evaporate the volatile blowing agent. The method (b) can reduce the content of organic volatile matters in the resulting open cell foam irrespective the content of organic volatile matters in the polystyrene resin. In the method (b), a pellet free from organic volatile matters may be formed after the steps of kneading a polystyrene resin together with water in an extruder and sucking out organic volatile matters through a vent as an azeotrope with water and the open cell foam may be produced from the pellet, although an open cell foam may be produced directly after the above steps.

In the above production methods, control of the temperature of the fluid gel in extrusion foaming is critical. The resin temperature at the time of extrusion is preferably controlled at 120–170° C. although it may be slightly varied by the physical properties of the polystyrene resin such as Vicat softening point, melt flow rate and molecular weight.

The temperature at which the polystyrene resin is melted is preferably controlled at 180–250° C., although it may slightly varied by the physical properties of the resin.

A foam obtained as above has skin layers having a foaming degree which is relatively lower than that of the inner part thereof. The inner part of the foam has an open cell content of 90% or higher, and the skin layers, which has a closed cell content which is relatively higher than that of the inner part, has an open cell content of 0–90%, preferably 0–50%. The polystyrene resin foam with skin layers has a density of 0.03–0.4 g/cm$^3$, preferably 0.03–0.2 g/cm$^3$, more preferably 0.03–0.1 g/cm$^3$, and an open cell content of 50–100%, preferably 60–100%. When the first 5.0 mm in thickness (depth) is removed from the surfaces of the foam, the resulting foam (foam with no skin layer) has an open cell content of at least 90%, preferably 95%, more preferably 100%. In the present invention, various types of polystyrene foams, whether with a high or low foaming rate, whether thick or thin, can be produced according to their use by forming such skin layers on the surfaces of the foam as in the case with conventional polystyrene resin foams.

Foams having an open cell content of lower than 90% among ones produced by the above method can be processed into an open cell foam of the present invention having an open cell content of 90% or higher by removing the skin layers formed thereon (skin layer formed in the production process). The removal of the skin layers can be suitably made with a belt sander, planer, or the like without forming a film covering an entire cut surface by fusion of the surface. The thickness of the skin layers of the foam produced by the above method is usually within 5 mm, so that removal of a slice thicker than 5 mm results in increase in production costs.

As other methods for obtaining an open cell foam having an open cell content of at least 90%, there are a method in which a pressure is applied to an open cell foam having an open cell content of about 70% or lower with a plate or a roll to break closed cells, a method in which a plurality of needles are inserted into such a foam to break closed cells without applying a pressure, and a method in which a pressure is applied to a foam and then a plurality of needles are inserted into the foam.

The open cell foam for use in the present invention has a 5% compressive strength at 23° C. of at least 0.05 MPa, preferably at least 0.1 MPa. The upper limit thereof is not specifically restricted but is generally 2 MPa. When a foam having a 5% compressive strength of lower than 0.05 MPa is put in a bag of a gas barrier material such as a foil of a metal such as aluminum; a laminated film with an intermediate layer of a gas barrier material such as polyvinylidene chloride or polyvinyl alcohol; or a low gas permeable plastic film comprising a plastic film of polyester or polyethylene on which a metal film is deposited or laminated and the bag is evacuated to establish a negative pressure therein, the foam cannot withstand the negative pressure and cell walls are buckled, resulting in a vacuum heat insulating material with low heat insulating properties and low thickness accuracy. In producing the vacuum heat insulating material, a getter agent for absorbing water vapor and/or gas is preferably put in the bag of a gas barrier material together with the foam as a core so that the heat insulating properties of the vacuum heat insulating material may be maintained for a long period of time.

The pressure inside the bag of a gas barrier material of the vacuum heat insulating material is preferably controlled to 250 Pa or lower in absolute pressure for reasons of productivity and heat insulating properties.

The compressive strength of the foam is measured according to JIS A 9511 (1989) as follows. A sample with a size of 50 mm long×50 mm wide×thickness of the foam is compressed in an atmosphere of 23° C. at a test (compression) rate of 10% of the initial thickness of the sample/min. The compressive strength is a value obtained by dividing the maximum load applied to the sample when the sample is compressed in the thickness direction by 5% by the pressure receiving area. The 5% compressive strength of the open cell foam of the present invention is mainly controlled by forming cells of a shape close to a sphere although it depends on the physical properties of the polystyrene resin, density of the open cell foam, shape of the cells, and, in the case of an open cell foam with skin layers which has been compressed, the compression degree. More specifically, the 5% compressive strength of the open cell foam of the present invention is mainly controlled by adjusting the ratio of the cell diameter T in the thickness direction to the cell diameter W in the width direction (T/W) and the ratio of the cell diameter T in the thickness direction to the cell diameter L in the length direction (T/L) in the range of about 0.1–1.5. In view of balance between compressive strength and thermal conductivity, the ratios are preferably in the range of 0.3–1.2.

The open cell foam preferably has a 5% compressive strength at 70° C. of at least 0.05 MPa so that the core material for a vacuum heat insulating material can have sufficient heat resistance not to be deformed by heat in a vacuum state. The 5% compressive strength at 70° C. is preferably 0.1 MPa or higher for reasons of higher thermal resistance. The upper limit of the 5% compressive strength at 70° C. is not specifically restricted but is generally 1 MPa.

The 5% compressive strength at 70° C. is obtained in the same manner described as above except that the measurement is performed at 70° C. after a sample has been maintained in an oven at 70° C. for 24 hours.

In the open cell foam of the present invention, the skin layers may be removed if desired. In this case, the cross-sections of the cells are exposed in the faces of the foam because of the removal of the skin layers. The cross-sections of the cells may be exposed in one or both of the primary faces, or all the faces including the side faces of the foam. Preferably, the cross-sections of the cells are exposed in all the faces to bring the open cell content of the foam close to 100%.

A foam obtained by applying a pressure with a plate or a roll without removing the skin layers is preferred because it generates no material loss and can be produced with high efficiency. A foam with cells communicated with each other not by applying a pressure but by inserting needles exhibits high compressive strength. Especially, an open cell foam produced without applying a pressure and having an open cell content of 90% or higher exhibits excellent compressive strength.

In the vacuum heat insulating material of the present invention, the thermal conductivity 30 days after packing is preferably not greater than that immediately after packing for reasons of stable thermal conductivity over a long period of time.

The polystyrene resin open cell foam of the present invention, which is a foam having an open cell structure with an open cell content of at least 90%, is excellent in heat insulating properties and compressive strength and thus suitable as a core material for a vacuum heat insulating material.

The vacuum heat insulating material of the present invention, which is produced by packing the open cell foam as a core material with a gas barrier film and evacuating the inside of the package, has a high heat insulating effect. The heat insulating material, which is used as a heat insulating panel or the like, is light in weight and easy to handle and causes less environmental problems in the production process as compared with conventional panels made of an inorganic powder or glass fibers. Also, the vacuum heat insulating material of the present invention has no need for pretreatment such as predrying before vacuum packing and has good vacuum maintainability as compared with open cell urethane foams. Also, the vacuum heat insulating material has good recyclability.

Since the open cell foam of the present invention exhibits high heat insulating properties when used as a core material for a vacuum heat insulating material and since the open cell foam has a content of organic volatile matters of less than 100 ppm, there are few factors that reduce the vacuum degree after vacuum packing. Thus, the open cell foam has good vacuum maintainability. In addition, when the open cell foam is produced through an azeotropic process, there is no need to identify the content of organic volatile matters of the material. Thus, the open cell foam can be produced with conventional devices and does not require very strict production conditions.

The method for producing the foam is characterized by using a blowing agent mainly composed of at least one blowing agent selected from propane, methyl chloride, ethyl chloride, dimethyl ether, methyl ethyl ether, and diethyl ether. Thus, an open cell foam having a high open cell content can be easily obtained with high production efficiency.

The vacuum heat insulating material of the present invention is advantageously used as a heat insulating material for a refrigerator, freezer, insulated truck, refrigerator vessel, freezing vessel, insulated container, insulated box, vender machine, floor heating system, underfloor material, ceiling, and wall.

EXAMPLES

The present invention will be described in detail based on the examples. In the examples and comparative examples, foams were prepared by either the following methods A or B.

Method A

A method for producing a foam using a device having the following structure is designated as method A.

A commercially available polystyrene resin is charged in a two-roll extruder having a screw diameter of 47 mm and melted by heating to 220° C. Then, water is pressure-injected into the extruder, and the polystyrene resin is kneaded. After removing water and organic volatile matters by opening a first vent and sucking with a vacuum pump connected to a second vent, the kneaded resin is extruded in the form of a strand through a lip. The extruded strand is palletized, thereby obtaining a polystyrene resin free from volatile organic matters (pretreated polystyrene resin). As a foam production device, an extruder comprising an extruder having a screw diameter of 65 mm, an extruder having a screw diameter of 90 mm and an extruder having a screw diameter of 150 mm connected is used. The extruder having a screw diameter of 150 mm has an end to which a flat die having a resin discharge port (lip) with a width of 115 mm and a gap of 2 mm is attached. A fluororesin forming implement having an entrance which is larger in dimension than the resin discharge port and an exit with a height of 25 mm and a width of 260 mm. In the forming implement, the height and the width increases gently from a point in the vicinity of the entrance toward the exit and then becomes constant.

The pretreated polystyrene resin is supplied to an extruder having a screw diameter of 65 mm and melted by heating to 220° C. A blowing agent is pressure-injected into the molten resin, which is then kneaded. The kneaded mixture is further kneaded in the extruder having a screw diameter of 90 mm and the extruder having a screw diameter of 150 mm sequentially and then extruded into ambient air through the lip and the forming implement, thereby obtaining a molded foam. The thus obtained foam has a skin. An open cell foam having a high open cell content can be obtained by removing skin layers from the top and bottom faces of the foam.

Method B

A commercially available polystyrene resin is used as it is without any pretreatment such as evacuation. Except that, an open cell foam is obtained in the same manner as in method A.

Example 1

As a raw material resin, a polystyrene resin (impact resistant polystyrene made by A & M Styrene Co., Ltd., trade name: A & M polystyrene HI (grade name: H9407), Vicat softening point: 89° C., total content of organic volatile matters: 350 ppm) was used. Talc as a cell regulating agent and methyl chloride as a blowing agent were added to the raw material resin in amounts of 10 parts by weight and 3.7 parts by weight, respectively, per 100 parts of the raw material resin, and a molded foam was prepared by the method A. The foaming temperature (temperature of the resin extruded from the extruder with a screw diameter of 150 mm) was set to 128° C. Immediately after the production, the plate-shaped molded foam was moved to a room with a temperature of 23° C. and a relative humidity of 50% and aged therein for 20 days. Then, the molded foam was measured for density, open cell content and total content of organic volatile matters. The results are summarized in Table 2. The aged plate-shaped molded foam was cut into 200 mm by 200 mm, and 3 mm thick slices were cut off of the top and bottom faces thereof (the 200 mm by 200 mm faces) to obtain an open cell foam without skin layer (which will be hereinafter referred to as skin-free foam) having a thickness of 12 mm. The physical properties of the thus obtained skin-free foam are shown in Table 2.

The skin-free foam was vacuum-packed (vacuum absolute pressure in the vacuum packing machine: 10 Pa, a getter agent (absorbing agent which absorbs air and water vapor)) with a gas barrier laminate film (PET/aluminum foil/low-density polyethylene=12 μm/9 μm/50 μm) to obtain a vacuum heat insulating panel. The thermal conductivity of the vacuum heat insulating panel was measured with a thermal conductivity tester manufactured by EKO INSTRUMENTS TRADING CO., LTD., according to JIS A 1412 (1994). The result is shown in Table 1. The heat conductivity 30 days after the production is also shown in Table 1. The result in Table 1 indicates that the skin-free foam is suitable as a core material for a vacuum heat insulating material.

The getter agent does not substantially absorb organic volatile matters but mainly absorbs water vapor and inorganic gases.

The heat conductivity of a heat insulating panel obtained by vacuum packing another plate-shaped molded foam with a gas barrier laminate film without removing the skin layers was measured. The result was almost the same as that of the insulating panel produced using the skin-free foam of Example 1.

Example 2

A molded foam was produced in the same manner as in Example 1 except that the amount of the cell regulating agent, talc was changed to 5 parts by weight. The foaming temperature (temperature of the resin extruded from the extruder with a screw diameter of 150 mm) was set to 128° C. Then, a plate-shaped molded foam, a skin-free foam having a thickness of 10 mm, and a vacuum heat insulating panel were obtained in the same manner as in Example 1. Their physical properties are summarized in Tables 1 and 2. The result in Table 1 indicates that the skin-free foam is suitable as a core material for a vacuum heat insulating material.

The heat conductivity of a heat insulating panel obtained by vacuum packing another plate-shaped molded foam with the same gas barrier laminate film as used in Example 1 without removing the skin layers was measured. The result was almost the same as that of the insulating panel produced using the skin-free foam of Example 2.

Example 3

As a raw material resin, a polystyrene resin (impact resistant polystyrene made by A & M Styrene Co., Ltd., trade name: A & M polystyrene HI (grade name: 433), Vicat softening point: 85° C., total content of organic volatile matters: 250 ppm) was used. Talc as a cell regulating agent and methyl chloride as a blowing agent were added to the raw material resin in amounts of 5 parts by weight and 3.7 parts by weight, respectively, per 100 parts of the raw material resin, and a molded foam was prepared by the method A. The foaming temperature (temperature of the resin extruded from the extruder with a screw diameter of 150 mm) was set to 128° C. Then, a plate-shaped molded foam, a skin-free foam having a thickness of 12 mm, and a vacuum heat insulating panel were obtained in the same manner as in Example 1. Their physical properties are summarized in Tables 1 and 2. The result in Table 1 indicates that the skin-free foam is suitable as a core material for a vacuum heat insulating material.

Example 4

As a raw material resin, a polystyrene type resin (styrene-methacrylic acid copolymer made by A & M Styrene Co., Ltd., trade name: A & M polystyrene Heat-resistant Type (grade name: G9001), MFR: 1.2 g/10 min, Vicat softening point: 117° C., total content of organic volatile matters: 300 ppm) was used. Talc as a cell regulating agent and methyl chloride as a blowing agent were added to the raw material resin in amounts of 10 parts by weight and 3.7 parts by weight, respectively, per 100 parts of the raw material resin, and a molded foam was prepared by the method A. The foaming temperature (temperature of the resin extruded from the extruder with a screw diameter of 150 mm) was set to 151° C. Then, a plate-shaped molded foam, a skin-free foam having a thickness of 12 mm, and a vacuum heat insulating panel were obtained in the same manner as in Example 1. Their physical properties are summarized in Tables 1 and 2. The result in Table 1 indicates that the skin-free foam is suitable as a core material for a vacuum heat insulating material. The skin-free foam had a compressive strength at 70° C. of 0.15 MPa.

Example 5

As a raw material resin, a polystyrene type resin (heat-resistant PSP polystyrene type resin made by Toyo Styrene Co., Ltd., a compound of a styrene-methacrylic acid copolymer comprising 92.2% by weight of styrene unit component and 7.8% by weight of methacrylic acid unit component and a methyl methacrylate-butadiene-styrene rubber (MBS resin) (MBS resin content: 4% by weight), trade name: Toyo Styrol (grade name: TF-2-311), MFR: 1.0 g/10 min, Vicat softening point: 116° C., total content of organic volatile matters: 300 ppm) was used. Talc as a cell regulating agent and methyl chloride as a blowing agent were added to the raw material resin in amounts of 10 parts by weight and 3.7 parts by weight, respectively, per 100 parts of the raw material resin, and a molded foam was prepared by the method A. The foaming temperature (temperature of the resin extruded from the extruder with a screw diameter of 150 mm) was set to 160° C. Then, a plate-shaped molded foam, a skin-free foam having a thickness of 12 mm, and a vacuum heat insulating panel were obtained in the same manner as in Example 1. Their physical properties are summarized in Tables 1 and 2. The result in Table 2 indicates that the skin-free foam is suitable as a core material for a vacuum heat insulating material. The skin-free foam had a compressive strength at 70° C. of 0.18 MPa.

Example 6

As a raw material resin, a polystyrene type resin (styrene-maleic anhydride copolymer resin made by Nova Chemicals Japan, trade name: Dylark (grade name: 232), MFR: 2.0 g/10 min, Vicat softening point: 112° C., total content of organic volatile matters: 1000 ppm) was used. Talc as a cell regulating agent and methyl chloride as a blowing agent were added to the raw material resin in amounts of 10 parts by weight and 3.7 parts by weight, respectively, per 100 parts of the raw material resin, and a molded foam was prepared by the method A. The foaming temperature (temperature of the resin extruded from the extruder with a screw diameter of 150 mm) was set to 151° C. Then, a plate-shaped molded foam, a skin-free foam having a thickness of 11 mm, and a vacuum heat insulating panel were obtained in the same manner as in Example 1. Their physical properties are summarized in Tables 1 and 2. The result in Table 1 indicates that the skin-free foam is suitable as a core material for a vacuum heat insulating material. The skin-free foam had a compressive strength at 70° C. of 0.20 MPa.

The heat conductivity of a heat insulating panel obtained by vacuum packing another plate-shaped molded foam with the same gas barrier laminate film as used in Example 1 without removing the skin layers was measured. The result was almost the same as that of the insulating panel produced using the skin-free foam of Example 6.

Example 7

A polystyrene resin (polystyrene resin for general use made by A & M Styrene Co., Ltd., trade name: A & M polystyrene GP (grade name: 679), Vicat softening point: 102° C., total content of organic volatile matters: 1200 ppm) was used as a raw material resin. Talc as a cell regulating agent and dimethyl ether as a blowing agent were added to the raw material resin in amounts of 5 parts by weight and 3.4 parts by weight, respectively, per 100 parts of the raw material resin, and a molded foam was prepared by the method A. The foaming temperature (temperature of the resin extruded from the extruder with a screw diameter of 150 mm) was set to 134° C. Then, a plate-shaped molded foam, a skin-free foam having a thickness of 12 mm, and a vacuum heat insulating panel were obtained in the same manner as in Example 1. Their physical properties are summarized in Tables 1 and 3. The result in Table 1 indicates that the skin-free foam is suitable as a core material for a vacuum heat insulating material.

Example 8

As a raw material resin, a polystyrene resin (impact resistant polystyrene made by A & M Styrene Co., Ltd., trade name: A & M polystyrene HI (grade name: H9407), Vicat softening point: 89° C., total content of organic volatile matters: 350 ppm) was used. Talc as a cell regulating agent and dimethyl ether as a blowing agent were added to the raw material resin in amounts of 5 parts by weight and 3.4 parts by weight, respectively, per 100 parts of the raw material resin, and a molded foam was prepared by the method A. The foaming temperature (temperature of the resin extruded from the extruder with a screw diameter of 150 mm) was set to 128° C. . Then, a plate-shaped molded foam, a skin-free foam having a thickness of 14 mm, and a vacuum heat insulating panel were obtained in the same manner as in Example 1. Their physical properties are summarized in Tables 1 and 3. The result in Table 1 indicates that the skin-free foam is suitable as a core material for a vacuum heat insulating material.

The heat conductivity of a heat insulating panel obtained by vacuum packing another plate-shaped molded foam with the same gas barrier laminate film as used in Example 1 without removing the skin layers was measured. The result was almost the same as that of the insulating panel produced using the skin-free foam of Example 8.

Example 9

As a raw material resin, a polystyrene type resin (heat-resistant PSP polystyrene type resin made by Toyo Styrene Co., Ltd., a compound of a styrene-methacrylic acid copolymer comprising 92.2% by weight of styrene unit component and 7.8% by weight of methacrylic acid unit component and a methyl methacrylate-butadiene-styrene rubber (MBS resin) (MBS resin content: 4% by weight), trade name: Toyo Styrol (grade name: TF-2-311), MFR: 1.0 g/10 min, Vicat softening point: 116° C., total content of organic volatile matters: 300 ppm) was used. Talc as a cell regulating agent and dimethyl ether as a blowing agent were added to the raw material resin in amounts of 10 parts by weight and 3.4 parts by weight, respectively, per 100 parts of the raw material resin, and a molded foam was prepared by the method A. The foaming temperature (temperature of the resin extruded from the extruder with a screw diameter of 150 mm) was set to 160° C. Then, a plate-shaped molded foam, a skin-free foam having a thickness of 14 mm, and a vacuum heat insulating panel were obtained in the same manner as in Example 1. Their physical properties are summarized in Tables 1 and 3. The result in Table 1 indicates that the skin-free foam is suitable as a core material for a vacuum heat insulating material. The skin-free foam had a compressive strength at 70° C. of 0.16 MPa.

Example 10

A polystyrene resin (polystyrene resin for general use made by A & M Styrene Co., Ltd., trade name: A & M polystyrene GP (grade name: 679), Vicat softening point: 102° C., total content of organic volatile matters: 1200 ppm) was used as a raw material resin. Talc as a cell regulating agent and propane as a blowing agent were added to the raw material resin in amounts of 5 parts by weight and 3.2 parts by weight, respectively, per 100 parts of the material resin, and a molded foam was prepared by the method A. The foaming temperature (temperature of the resin extruded from the extruder with a screw diameter of 150 mm) was set to 134° C. Then, a plate-shaped molded foam, a skin-free foam having a thickness of 12 mm, and a vacuum heat insulating panel were obtained in the same manner as in Example 1. Their physical properties are summarized in Tables 1 and 3. The result in Table 1 indicates that the skin-free foam is suitable as a core material for a vacuum heat insulating material.

The content of organic volatile matters of the skin-free foams obtained in Examples 1–10 was below the detection limit.

Comparative Example 1

As a raw material resin, a polystyrene resin (polystyrene resin for general use made by A & M Styrene Co., Ltd., trade name: A & M polystyrene GP (grade name: 679), Vicat softening point: 102° C., total content of organic volatile matters: 1200 ppm) was used. Talc as a cell regulating agent and methyl chloride as a blowing agent were added to the raw material resin in amounts of 10 parts by weight and 3.7 parts by weight, respectively, per 100 parts of the raw material resin, and a molded foam was prepared by the method B. The foaming temperature (temperature of the resin extruded from the extruder with a screw diameter of 150 mm) was set to 134° C. Then, a plate-shaped molded foam, a skin-free foam having a thickness of 10 mm, and a vacuum heat insulating panel were obtained in the same manner as in Example 1. Their physical properties are summarized in Tables 1 and 2.

The skin-free foam, which was prepared adding talc at a rate of 10 parts by weight, had a small cell diameter and exhibited quite a low thermal conductivity immediately after the vacuum packing. However, the foam had as quite a high total content of organic volatile matters as 1000 ppm, so that the vacuum degree was lowered and the heat insulating properties were largely decreased as the days went on.

Comparative Example 2

A molded foam was produced in the same manner as in Comparative Example 1 except that the amount of the cell regulating agent, talc was changed to 5 parts by weight. The foaming temperature (temperature of the resin extruded from the extruder with a screw diameter of 150 mm) was set to 134° C. Then, a plate-shaped molded foam, a skin-free foam having a thickness of 11 mm, and a vacuum heat insulating panel were obtained in the same manner as in Example 1. Their physical properties are summarized in Tables 1 and 2.

The skin-free foam exhibited a relatively low thermal conductivity immediately after the vacuum packing. However, the foam had as quite a high total content of organic volatile matters as 1000 ppm as in the case with Comparative Example 1, so that the vacuum degree was lowered and the heat insulating properties were largely decreased as the days went on.

Comparative Example 3

As a raw material resin, a polystyrene resin (H9407, the same one as used in Example 1) was used. Talc as a cell regulating agent and methyl chloride as a blowing agent were added to the raw material resin in amounts of 10 parts by weight and 3.7 parts by weight, respectively, per 100 parts of the raw material resin, and a molded foam was prepared by the method B. The foaming temperature (temperature of the resin extruded from the extruder with a screw diameter of 150 mm) was set to 128° C. Then, a plate-shaped molded foam, a skin-free foam having a thickness of 10 mm, and a vacuum heat insulating panel were obtained in the same manner as in Example 1. Their physical properties are summarized in Tables 1 and 2.

The skin-free foam, which was prepared adding talc at a rate of 10 parts by weight, had a small cell diameter and exhibited quite a low thermal conductivity immediately after the vacuum packing. However, the foam contained 300 ppm of organic volatile matters in total, so that the vacuum degree was lowered and the heat insulating properties gradually got worse as the days went on.

Comparative Example 4

A molded foam was produced in the same manner as in Comparative Example 3 except that the amount of the cell regulating agent, talc was changed to 5 parts by weight. The foaming temperature (temperature of the resin extruded from the extruder with a screw diameter of 150 mm) was set to 128° C. Then, a plate-shaped molded foam, a skin-free foam having a thickness of 12 mm, and a vacuum heat insulating panel were obtained in the same manner as in Example 1. Their physical properties are summarized in Tables 1 and 2.

The skin-free foam exhibited a relatively low thermal conductivity immediately after the vacuum packing. However, the foam contained 300 ppm of organic volatile matters in total, so that the vacuum degree was lowered and the heat insulating properties gradually got worse as the days went on.

Comparative Example 5

As a raw material resin, a polystyrene resin (433, the same one as used in Example 3) was used. Talc as a cell regulating agent and methyl chloride as a blowing agent were added to the raw material resin in amounts of 5 parts by weight and 3.7 parts by weight, respectively, per 100 parts of the raw material resin, and a molded foam was prepared by the method B. The foaming temperature (temperature of the resin extruded from the extruder with a screw diameter of 150 mm) was set to 128° C. Then, a plate-shaped molded foam, a skin-free foam having a thickness of 12 mm, and a vacuum heat insulating panel were obtained in the same manner as in Example 1. Their physical properties are summarized in Tables 1 and 2.

The skin-free foam exhibited a relatively low thermal conductivity immediately after the vacuum packing. Although the total content of organic volatile matters in the foam was 200 ppm, which was the lowest in Comparative Examples, the vacuum degree was lowered and the heat insulating properties gradually got worse as the days went on.

Comparative Example 6

As a raw material resin, a polystyrene type resin (heat-resistant PSP polystyrene type resin made by Toyo Styrene Co., Ltd., a compound of a styrene-methacrylic acid copolymer comprising 92.2% by weight of styrene unit component and 7.8% by weight of methacrylic acid unit component and a methyl methacrylate-butadiene-styrene rubber (MBS resin) (MBS resin content: 4% by weight), trade name: Toyo Styrol (grade name: TF-2-311), MFR: 1.0 g/10 min, Vicat softening point: 116° C., total content of organic volatile matters: 300 ppm) was used. Talc as a cell regulating agent and methyl chloride as a blowing agent were added to the raw material resin in amounts of 10 parts by weight and 3.7 parts by weight, respectively, per 100 parts of the raw material resin, and a molded foam was prepared by the method B. The foaming temperature (temperature of the resin extruded from the extruder with a screw diameter of 150 mm) was set to 160° C. Then, a plate-shaped molded foam, a skin-free foam having a thickness of 12 mm, and a vacuum heat insulating panel were obtained in the same manner as in Example 1. Their physical properties are summarized in Tables 1 and 3.

The skin-free foam exhibited a relatively low thermal conductivity immediately after the vacuum packing. However, the foam had as quite a high total content of organic volatile matters as 300 ppm, so that the vacuum degree was lowered and the heat insulating properties were largely decreased as the days went on.

Comparative Example 7

As a raw material resin, a polystyrene resin (polystyrene resin for general use made by A & M Styrene Co., Ltd., trade name: A & M polystyrene GP (grade name: 679), Vicat softening point: 102° C., total content of organic volatile matters: 1200 ppm) was used. Talc as a cell regulating agent and dimethyl ether as a blowing agent were added to the raw material resin in amounts of 5 parts by weight and 3.4 parts by weight, respectively, per 100 parts of the raw material resin, and a molded foam was prepared by the method B. The foaming temperature (temperature of the resin extruded from the extruder with a screw diameter of 150 mm) was set to 134° C. Then, a plate-shaped molded foam, a skin-free foam having a thickness of 12 mm, and a vacuum heat insulating panel were obtained in the same manner as in Example 1. Their physical properties are summarized in Tables 1 and 3.

The skin-free foam exhibited a relatively low thermal conductivity immediately after the vacuum packing. However, the foam had as quite a high total content of organic volatile matters as 1000 ppm, so that the vacuum degree was lowered and the heat insulating properties were largely decreased as the days went on.

Comparative Example 8

As a raw material resin, a polystyrene type resin (heat-resistant PSP polystyrene type resin made by Toyo Styrene Co., Ltd., a compound of a styrene-methacrylic acid copolymer comprising 92.2% by weight of styrene unit component and 7.8% by weight of methacrylic acid unit component and a methyl methacrylate-butadiene-styrene rubber (MBS resin) (MBS resin content: 4% by weight), trade name: Toyo Styrol (grade name: TF-2-311), MFR: 1.2 g/10 min, Vicat softening point: 116° C., total content of organic volatile matters: 300 ppm) was used. Talc as a cell regulating agent and dimethyl ether as a blowing agent were added to the raw material resin in amounts of 10 parts by weight and 3.4 parts by weight, respectively, per 100 parts of the raw material resin, and a molded foam was prepared by the method B in the same manner as in Example 6 except that the temperature in the extruder having a screw diameter of 65 mm was increased to 230° C. The foaming temperature (temperature of the resin extruded from the extruder with a screw diameter of 150 mm) was set to 160° C. Then, a plate-shaped molded foam, a skin-free foam having a thickness of 14 mm, and a vacuum heat insulating panel were obtained in the same manner as in Example 1. Their physical properties are summarized in Tables 1 and 3.

The skin-free foam exhibited a relatively low thermal conductivity immediately after the vacuum packing. However, the foam had as quite a high total content of organic volatile matters as 350 ppm, so that the vacuum degree was lowered and the heat insulating properties were largely decreased as the days went on.

The content of organic volatile matters in each of the plate-shaped molded foams of Examples 1–10 and Comparative Examples 1–8 shown in Tables 2b and 3b is a value measured after one week of aging after extrusion. The content of organic volatile matters in each of the skin-free foams was measured after removing the skin layers after one week of aging after extrusion.

TABLE 1

| Example | Pressure *(1) | Getter *(2) | X *(3) | Y *(4) | Y − X *(5) |
|---|---|---|---|---|---|
| 1 | 10 | Used | 0.0100 | 0.0093 | −0.0007 |
| 2 | 10 | Used | 0.0122 | 0.0118 | −0.0004 |

TABLE 1-continued

| Example | Pressure *(1) | Getter *(2) | X *(3) | Y *(4) | Y − X *(5) |
|---|---|---|---|---|---|
| 3 | 10 | Used | 0.0121 | 0.0117 | −0.0004 |
| 4 | 10 | Used | 0.0086 | 0.0081 | −0.0005 |
| 5 | 10 | Used | 0.0081 | 0.0079 | −0.0002 |
| 6 | 10 | Used | 0.0080 | 0.0075 | −0.0005 |
| 7 | 10 | Used | 0.0118 | 0.0115 | −0.0003 |
| 8 | 10 | Used | 0.0119 | 0.0115 | −0.0004 |
| 9 | 10 | Used | 0.0082 | 0.0077 | −0.0005 |
| 10 | 10 | Used | 0.0113 | 0.0109 | −0.0004 |
| Comp. 1 | 10 | Used | 0.0092 | 0.0120 | 0.0028 |
| Comp. 2 | 10 | Used | 0.0121 | 0.0164 | 0.0043 |
| Comp. 3 | 10 | Used | 0.0100 | 0.0122 | 0.0022 |
| Comp. 4 | 10 | Used | 0.0122 | 0.0158 | 0.0036 |
| Comp. 5 | 10 | Used | 0.0121 | 0.0157 | 0.0036 |
| Comp. 6 | 10 | Used | 0.0079 | 0.0117 | 0.0038 |
| Comp. 7 | 10 | Used | 0.0119 | 0.0162 | 0.0043 |
| Comp. 8 | 10 | Used | 0.0078 | 0.0115 | 0.0037 |

* (1): Vacuum degree in packing device, Absolute pressure (Pa)
* (2): Getter agent
* (3): Thermal conductivity immediately after packing (X) (W/mK)
* (4): Thermal conductivity 30 days after packing (Y) (W/mK)
* (5): (Y) − (X) (W/mK)

TABLE 2a

| Example | Name *(1) | Amount of volatile matters *(2) | Method *(3) | Amount of volatile matters *(4) | Foaming temperature (° C.) |
|---|---|---|---|---|---|
| 1 | H9407 | 350 | A | Below detection limit | 128 |
| 2 | H9407 | 350 | A | Below detection limit | 128 |
| 3 | 433 | 250 | A | Below detection limit | 128 |
| 4 | G9001 | 300 | A | Below detection limit | 151 |
| 5 | TF-2-311 | 300 | A | Below detection limit | 160 |
| 6 | 232 | 1000 | A | Below detection limit | 151 |
| Comp. 1 | 679 | 1200 | B | Not treated (1200) | 134 |
| Comp. 2 | 679 | 1200 | B | Not treated (1200) | 134 |
| Comp. 3 | H9407 | 350 | B | Not treated (350) | 128 |
| Comp. 4 | H9407 | 350 | B | Not treated (350) | 128 |
| Comp. 5 | 433 | 250 | B | Not treated (250) | 128 |

* (1): Material grade name
* (2): Total content of organic volatile matters in commercially available polystyrene resin (ppm)
* (3): Production method
* (4): Total content of organic volatile matters after treatment (ppm)

TABLE 2b-1

| | Plate-shaped molded foam | | |
|---|---|---|---|
| Example | Density (g/cm³) | Open cell content (%) | Total content of organic volatile matters (ppm) |
| 1 | 0.100 | 98 | Below detection limit |
| 2 | 0.095 | 94 | Below detection limit |
| 3 | 0.099 | 89 | Below detection limit |
| 4 | 0.069 | 81 | Below detection limit |
| 5 | 0.081 | 80 | Below detection limit |
| 6 | 0.100 | 92 | Below detection limit |
| Comp. 1 | 0.093 | 81 | 1000 |
| Comp. 2 | 0.067 | 93 | 1000 |
| Comp. 3 | 0.101 | 99 | 300 |
| Comp. 4 | 0.096 | 95 | 300 |
| Comp. 5 | 0.099 | 87 | 200 |

TABLE 2b 2

| | Skin-free foam | | | | |
|---|---|---|---|---|---|
| Example | Density (g/cm³) | Open cell content (%) | Cell diameter in thickness direction (μm) | Total content of organic volatile matters (ppm) | Compressive strength at 23° C. (MPa) |
| 1 | 0.102 | 100 | 120 | Below detection limit | 0.17 |
| 2 | 0.081 | 100 | 220 | Below detection limit | 0.16 |
| 3 | 0.088 | 100 | 210 | Below detection limit | 0.18 |
| 4 | 0.083 | 100 | 100 | Below detection limit | 0.36 |
| 5 | 0.080 | 100 | 100 | Below detection limit | 0.45 |
| 6 | 0.106 | 100 | 90 | Below detection limit | 0.56 |
| Comp. 1 | 0.095 | 100 | 110 | 1000 | — |
| Comp. 2 | 0.066 | 98 | 220 | 1000 | — |
| Comp. 3 | 0.107 | 100 | 120 | 300 | — |
| Comp. 4 | 0.080 | 100 | 220 | 300 | — |
| Comp. 5 | 0.087 | 100 | 210 | 200 | — |

TABLE 3a

| Example | Name *(1) | Amount of volatile matters *(2) | Method *(3) | Amount of volatile matters *(4) | Foaming temperature (° C.) |
|---|---|---|---|---|---|
| 7 | 679 | 1200 | A | Below detection limit | 134 |
| 8 | H9407 | 350 | A | Below detection limit | 128 |
| 9 | TF-2-311 | 300 | A | Below detection limit | 160 |

TABLE 3a-continued

| Example | Name *(1) | Amount of volatile matters *(2) | Method *(3) | Amount of volatile matters *(4) | Foaming temperature (°C.) |
|---|---|---|---|---|---|
| 10 | 679 | 1200 | A | Below detection limit | 134 |
| Comp. 6 | TF-2-311 | 300 | B | Not treated (300) | 160 |
| Comp. 7 | 679 | 1200 | B | Not treated (1200) | 134 |
| Comp. 8 | TF-2-311 | 300 | B | Not treated (300) | 160 |

* (1): Material grade name
* (2): Total content of organic volatile matters in commercially available polystyrene resin (ppm)
* (3): Production method
* (4): Total content of organic volatile matters after treatment (ppm)

TABLE 3b-1

| | Plate-shaped molded foam | | |
|---|---|---|---|
| Example | Density (g/cm$^3$) | Open cell content (%) | Total content of organic volatile matters (ppm) |
| 7 | 0.062 | 77 | Below detection limit |
| 8 | 0.091 | 90 | Below detection limit |
| 9 | 0.066 | 83 | Below detection limit |
| 10 | 0.055 | 78 | Below detection limit |
| Comp. 6 | 0.085 | 82 | 300 |
| Comp. 7 | 0.062 | 75 | 1000 |
| Comp. 8 | 0.068 | 85 | 350 |

TABLE 3b-2

| | Skin-free foam | | | | |
|---|---|---|---|---|---|
| Example | Density (g/cm$^3$) | Open cell content (%) | Cell diameter in thickness direction (μm) | Total content of organic volatile matters (ppm) | Compressive strength at 23° C. (MPa) |
| 7 | 0.068 | 100 | 200 | Below detection limit | 0.13 |
| 8 | 0.082 | 100 | 190 | Below detection limit | 0.17 |
| 9 | 0.078 | 100 | 90 | Below detection limit | 0.46 |
| 10 | 0.066 | 100 | 160 | Below detection limit | 0.14 |
| Comp. 6 | 0.081 | 100 | 100 | 300 | — |
| Comp. 7 | 0.067 | 100 | 210 | 1000 | — |
| Comp. 8 | 0.081 | 100 | 90 | 350 | — |

The physical properties in the tables 2 and 3 were measured as follows.

Density:

Measurement was performed according to the method of measuring apparent density provided in JIS K6767 (1976).

Open Cell Content:

The method has been described before.

Content of Organic Volatile Matters:

The method has been described before.

In the chromatograms obtained in the measurement of organic volatile matters in the foams, no peak was detected except those of cyclopentanol as the internal standard substance and dimethylformamide as a solvent.

Compressive Strength:

The method has been described before.

The thermal conductivity in Examples and Comparative Examples was measured by the following method.

Thermal Conductivity:

Measurement was performed by a plate heat flow meter method (twin-plate type, average temperature: 23° C.) provided in JIS A1412 (1994). The sample for measurement was a vacuum packed core material (foam from which the skin layers on both sides had been removed) for a vacuum heat insulating material having a size of 200 mm (length)× 200 mm (width)×thickness of the sample.

The invention claimed is:

1. A vacuum heat insulating material comprising:
    an open cell foam core comprising a polystyrene resin foam having an open cell content of at least 90%, a density of 0.03–0.4 g/cm$^3$ and a cell diameter in the direction of the thickness of said foam of less than 400 μm, said polystyrene resin foam having a content of organic volatile matter of less than 100 ppm, said organic volatile matter having a boiling point of not higher than 160° C. under ambient pressure; and
    a barrier film covering said open cell foam core in an evacuated state;
    wherein said vacuum heat insulating material is produced by covering said open cell foam core with the gas barrier film, and evacuating the interior of the gas barrier film.

2. A vacuum heat insulating material as recited in claim 1, wherein said polystyrene resin foam has a content of said organic volatile matter of 50 ppm or less.

3. A vacuum heat insulating material as recited in claim 1, wherein said polystyrene resin foam has a content of said organic volatile matter of less than 20 ppm.

4. A vacuum heat insulating material as recited in claim 1, wherein said polystyrene resin foam has a cell diameter in the direction of the thickness of said foam of 80 to 200 μm.

5. A vacuum heat insulating material as recited in claim 1, wherein said polystyrene resin foam has a thickness of 5.0 to 50.0 mm.

6. A vacuum heat insulating material as recited in claim 1, wherein said open cell foam core has a density of 0.03 to 0.2 g/cm$^3$ and a 5% compressive strength at 23° C. of at least 0.05 MPa.

7. A method for producing an open cell foam according to claim 1 having a content of organic volatile matters of less than 100 ppm, wherein said method comprises melt-kneading a polystyrene resin having a content of organic volatile matters of less than 100 ppm together with a blowing agent in an extruder, and then extruding the kneaded mixture into a lower pressure area to cause said polystyrene resin to foam.

8. A method for producing an open cell foam as claimed in claim 7, wherein said blowing agent comprises, as a main component, at least one blowing agent selected from propane, methyl chloride, dimethyl ether, methyl ethyl ether and diethyl ether.

9. A method for producing an open cell foam according to claim 1, wherein said method comprises melt-kneading a polystyrene resin together with water in an extruder, sucking out volatile matters through a vent as an azeotrope with water, injecting a blowing agent and kneading said polystyrene resin therewith, and extruding 10 the kneaded mixture into a lower pressure area to cause said polystyrene resin to foam.

* * * * *

UNITED STATES PATENT AND TRADEMARK OFFICE
CERTIFICATE OF CORRECTION

PATENT NO. : 7,166,348 B2 Page 1 of 1
APPLICATION NO. : 10/380280
DATED : January 23, 2007
INVENTOR(S) : Naito et al.

It is certified that error appears in the above-identified patent and that said Letters Patent is hereby corrected as shown below:

Column 24, line 2 (claim 9, line 2) "extruding 10 the" should read -- extruding the --.

Signed and Sealed this

Fifteenth Day of May, 2007

JON W. DUDAS
*Director of the United States Patent and Trademark Office*